United States Patent
Soto et al.

(10) Patent No.: US 6,222,437 B1
(45) Date of Patent: *Apr. 24, 2001

(54) SURFACE MOUNTED MAGNETIC COMPONENTS HAVING SHEET MATERIAL WINDINGS AND A POWER SUPPLY INCLUDING SUCH COMPONENTS

(75) Inventors: Louis A. Soto, Warwick, RI (US); Paul W. Godek, Brockton, MA (US)

(73) Assignee: Nidec America Corporation, Torrington, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,896

(22) Filed: May 11, 1998

(51) Int. Cl.[7] .................................................. H01F 5/00
(52) U.S. Cl. ........................................... 336/200; 336/83
(58) Field of Search ............................... 336/83, 200, 205, 336/223, 226, 232, 206, 225, 183

(56) References Cited

U.S. PATENT DOCUMENTS

| | | | |
|---|---|---|---|
| 2,851,765 | * 9/1958 | Hanlet | 336/205 |
| 2,943,966 | * 7/1960 | Leno et al. | 336/200 |
| 3,002,260 | * 10/1961 | Shortt et al. | 336/200 |
| 4,423,361 | 12/1983 | Stenudd et al. | 318/135 |
| 4,517,540 | * 5/1985 | McDougal | 336/205 |
| 4,613,843 | 9/1986 | Esper | 336/232 |
| 4,651,254 | * 3/1987 | Brede et al. | 361/248 |
| 4,654,571 | 3/1987 | Hinds | 318/687 |
| 4,943,793 | 7/1990 | Ngo et al. | 336/83 |
| 4,959,630 | * 9/1990 | Yerman et al. | 336/83 |
| 5,017,902 | * 5/1991 | Yerman et al. | 336/83 |
| 5,084,958 | * 2/1992 | Yerman et al. | 29/606 |
| 5,134,770 | * 8/1992 | Yerman et al. | 29/606 |
| 5,142,767 | 9/1992 | Adams et al. | 29/602.1 |
| 5,175,525 | 12/1992 | Smith | 336/82 |
| 5,179,365 | 1/1993 | Raggi | 336/65 |

FOREIGN PATENT DOCUMENTS

| | | | |
|---|---|---|---|
| 1056272 | * 4/1959 | (DE) . | |
| 29274 | * of 1914 | (GB) | 336/223 |
| 2-88310 | * 11/1990 | (JP) . | |

OTHER PUBLICATIONS

Application Note: Secondary Side Post Regulator (SSPR) for Switching Power Supplies with Multiple Outputs, Gedaly Levin, CSC™ Cherry Semiconductor Corporation, Revised Mar. 19, 1996.

CS–5101 Demonstration Board Manual: Multiple output, telecommunications power supply with secondary side control for tight output regulation, CSC™ Cherry Semiconductor Corporation.

Primary Examiner—Michael L. Gellner
Assistant Examiner—Tuyen Nguyen
(74) Attorney, Agent, or Firm—Cummings & Lockwood

(57) ABSTRACT

A blank formed from electrically conductive sheet material defines a continuous conductive path which includes two terminal ends and at least three loops disposed along the path. The blank is foldable at preselected folding locations on the path to position the loops in overlying relation to one another, and the blank is preferably formed with the loops disposed along the conductive path in substantially the same plane. The blank is used to form a multi-turn planar winding for a magnetic device such as, for example, an inductor or transformer which may be incorporated into electrical circuits such as power supplies. The planar magnetic device provides a low overall volume and profile, as well as a substantially higher volume or surface area of conductive material per turn of the winding compared to conventional wire or etched windings to provide a higher current carrying capacity and fewer turns compared to conventional windings.

31 Claims, 9 Drawing Sheets

U.S. PATENT DOCUMENTS

| | | | |
|---|---|---|---|
| 5,321,380 | 6/1994 | Godek et al. | 336/232 |
| 5,400,005 | 3/1995 | Bobry | 336/83 |
| 5,414,401 | 5/1995 | Roshen et al. | 336/178 |
| 5,499,154 | 3/1996 | Cullison . | |
| 5,534,768 | 7/1996 | Chavannes et al. . | |
| 5,559,487 | 9/1996 | Butcher et al. | 336/178 |
| 5,565,837 | 10/1996 | Godek et al. | 336/232 |
| 5,594,631 | 1/1997 | Katoozi et al. . | |
| 5,600,293 | 2/1997 | Hunter | 336/182 |
| 5,631,822 | 5/1997 | Silberkleit et al. | 363/144 |

* cited by examiner

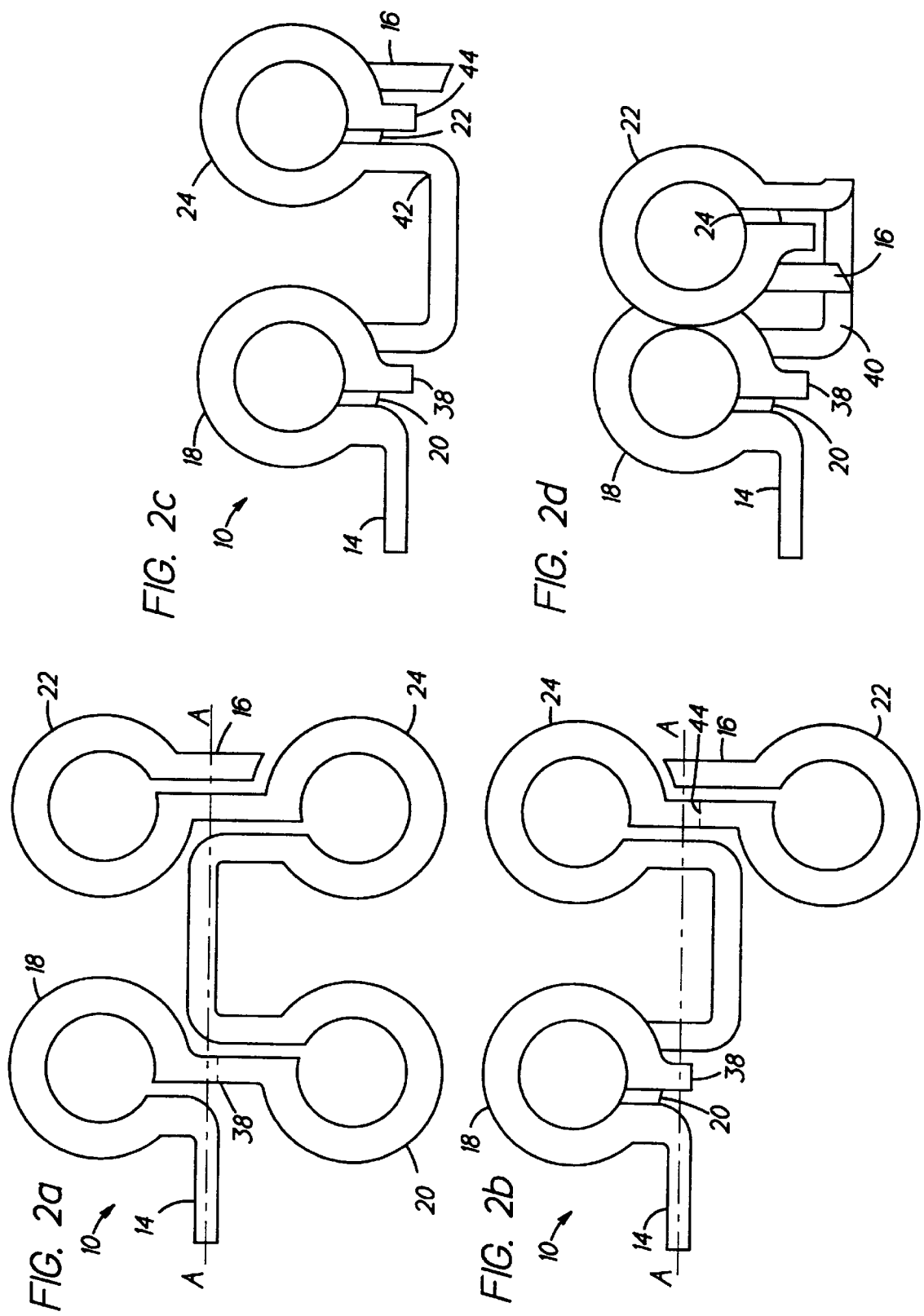

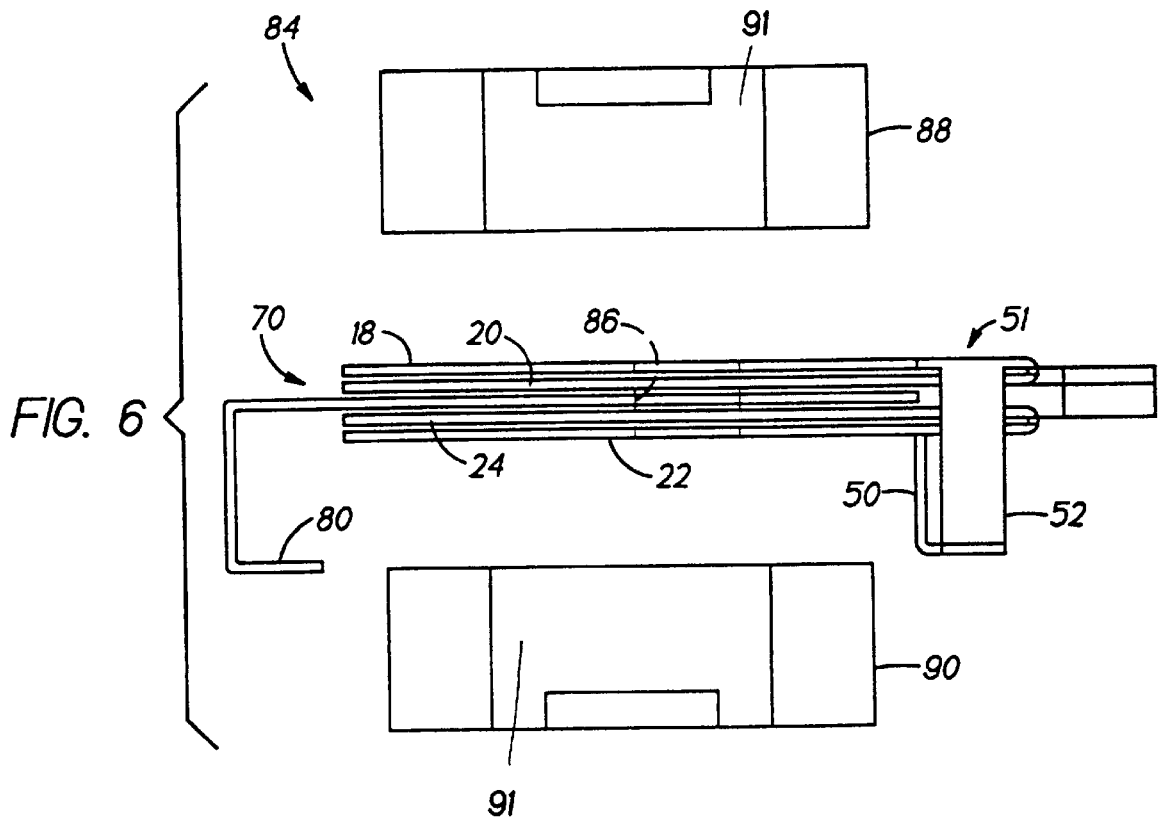
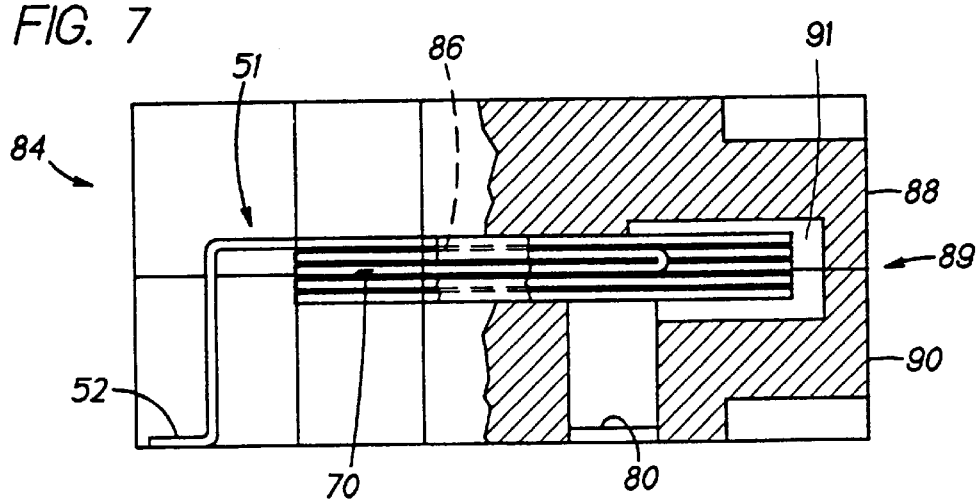

SURFACE MOUNTED MAGNETIC COMPONENTS HAVING SHEET MATERIAL WINDINGS AND A POWER SUPPLY INCLUDING SUCH COMPONENTS

BACKGROUND OF THE INVENTION

The present invention relates generally to low profile surface mounted magnetic components and, more particularly, to magnetic components which include windings defined by a folded sheet material blank. The invention further relates to a multiple output switching power supply incorporating such components.

Surface mounted magnetic components such as inductors and transformers have typically been constructed using conductive wire having a circular cross-section wound around a ferrite core. Components constructed in this manner are quite large relative to other surface mounted components, particularly in the height dimension, due to the large number of windings required and because of the size of the ferrite core. This is particularly the case in high power applications where it is necessary to use large diameter wire. Such components also generate a substantial amount of heat due to conductive loses which occur as a result of the large number of windings typically required for these components.

More recently, magnetic components having planar windings etched in a spiral format on a printed circuit board have been utilized. These components are compact and have a low profile due to the planar etched windings. However, the etched windings do not provide sufficient current carrying capability for high power applications.

Magnetic components including a plurality of stamped windings are known in the art. Due to the higher volume of copper provided by the stamped windings, such components are more suitable than components having etched windings for high power applications and are therefore useful in devices such as high current switching power supplies. However, each of the stamped windings must be individually connected by a lead frame to an associated connection pad on the PC board. The substantial number of solder connections that are required makes assembly of devices including such components both difficult and time consuming and also raises concerns regarding the reliability of these devices.

Accordingly, there is a need for low profile magnetic components which provide sufficient current carrying capability for high power applications and which have low leakage inductance, low conductive loses and reduced heat output. There is also a need for devices, such as switching power supplies, incorporating such components which having improved reliability and repeatability in manufacturing.

SUMMARY OF THE INVENTION

The present invention provides, in one aspect, a blank formed from conductive sheet material. The blank defines a continuous conductive path which includes two terminal ends and at least three loops disposed along the path. The blank is foldable at preselected folding locations on the path to position the loops in overlying relation to one another. The blank is formed, for example, by stamping, punching or cutting the blank from the sheet of conductive material, and the blank is preferably formed with the loops disposed alone the conductive path in substantially the same plane. The terminal ends provide means for electrically connecting the conductive path within an electrical circuit.

In the preferred embodiment, the conductive path defined by the blank comprises an alternating series of loops and connecting portions. The series includes a first pair of loops connected together by a first connecting portion and at least a third loop connected to the first pair of loops by a second connecting portion which extends between one of the loops in the first pair and the third loop. The loops and the connecting portions are disposed relative to one another such that when the blank is folded at the preselected folding locations, the first pair of loops and the third loop are positioned in overlying relation to one another.

The blank is used to form a multi-turn planar winding for a magnetic device such as, for example, an inductor or transformer. Since the sheet material blank defines a number of loops having a flat or planar profile, the loops or turns of the winding are positioned immediately adjacent to one another in a very close stacking arrangement when the blank is folded. This close stacking provides a winding which has a low overall volume and a low profile relative to conventional discrete inductors and transformers. The winding formed from the sheet material blank also provides a substantially higher volume or surface area of conductive material in each turn of the winding than is available in conventional wire or etched windings so as to provide a higher current carrying capacity relative to such conventional windings. This results in a winding that has fewer turns (reduced length) than would be required in conventional windings having equivalent current carrying capacity.

In a second aspect, the invention provides a planar magnetic device, which includes a planar multi-turn winding formed from the folded blank. The device further includes an inductive core magnetically coupled to the winding to form a closed magnetic loop, and means for electrically insulating the winding turns from one another and from the inductive core.

In one embodiment, the planar magnetic device is a transformer, wherein the loops define a planar multi-turn primary winding of the transformer, and the terminal ends provide means for electrically connecting the primary winding with an electrical circuit. The transformer further includes a second blank which defines a second continuous conductive path. The second conductive path includes two terminal ends and at least one loop. This loop defines a planar single-turn secondary winding of the transformer which is disposed within the device adjacent to the primary winding, and preferably between two consecutive turns of the primary winding. Means are also provided for insulating the turns of the primary winding from one another and from the single-turn secondary winding and for insulating all of the windings from the inductive core.

The above-described transformer provides enhanced electromagnetic coupling between the primary and secondary windings because the planar single-turn secondary winding is positioned directly adjacent to at least one, and preferably between two, of the turns of the planar primary winding in a close stacking arrangement. The close coupling between the primary and secondary planar windings reduces the leakage inductance of the device. The planar windings also provide the transformer with a low overall volume because of the close stacking arrangement and a low profile since the windings are patterned to fit the transformer core and substantially fully utilize the core window area. The increased current carrying capacity of the planar windings and their reduced length relative to conventional windings of similar current capacity results in lower conduction losses and higher thermal dissipation to prevent overheating than is typical of prior art transformers and other inductive devices which utilize conventional windings.

In yet another aspect, the present invention provides a switching power supply with at least one voltage output which includes the above-described transformer. The power supply includes a well-regulated split in voltage outputs in those instances where the power supply employs two or more voltage outputs. The transformer provides the power supply with increased power density and also permits higher switching frequencies and a reduced overall package size since, as noted above, the transformer is characterized by lower leakage inductance, lower conduction losses and higher thermal dissipation than is typical of prior art transformers.

Other advantages of the present invention will become apparent in view of the following detailed description and accompanying drawings.

BRIEF DESCRIPTION OF THE DRAWINGS

FIGS. 2a–2e are a series of top plan views illustrating the sequence for folding the blank of FIG. 1 into a multi-turn transformer primary winding.

FIG. 6 is an exploded side view of a transformer embodying the invention and including the primary winding shown in FIG. 3 and the secondary winding shown in FIG. 5.

FIG. 7 is a partial side section of the transformer shown in FIG. 6.

DETAILED DESCRIPTION OF THE INVENTION

Figure 1:
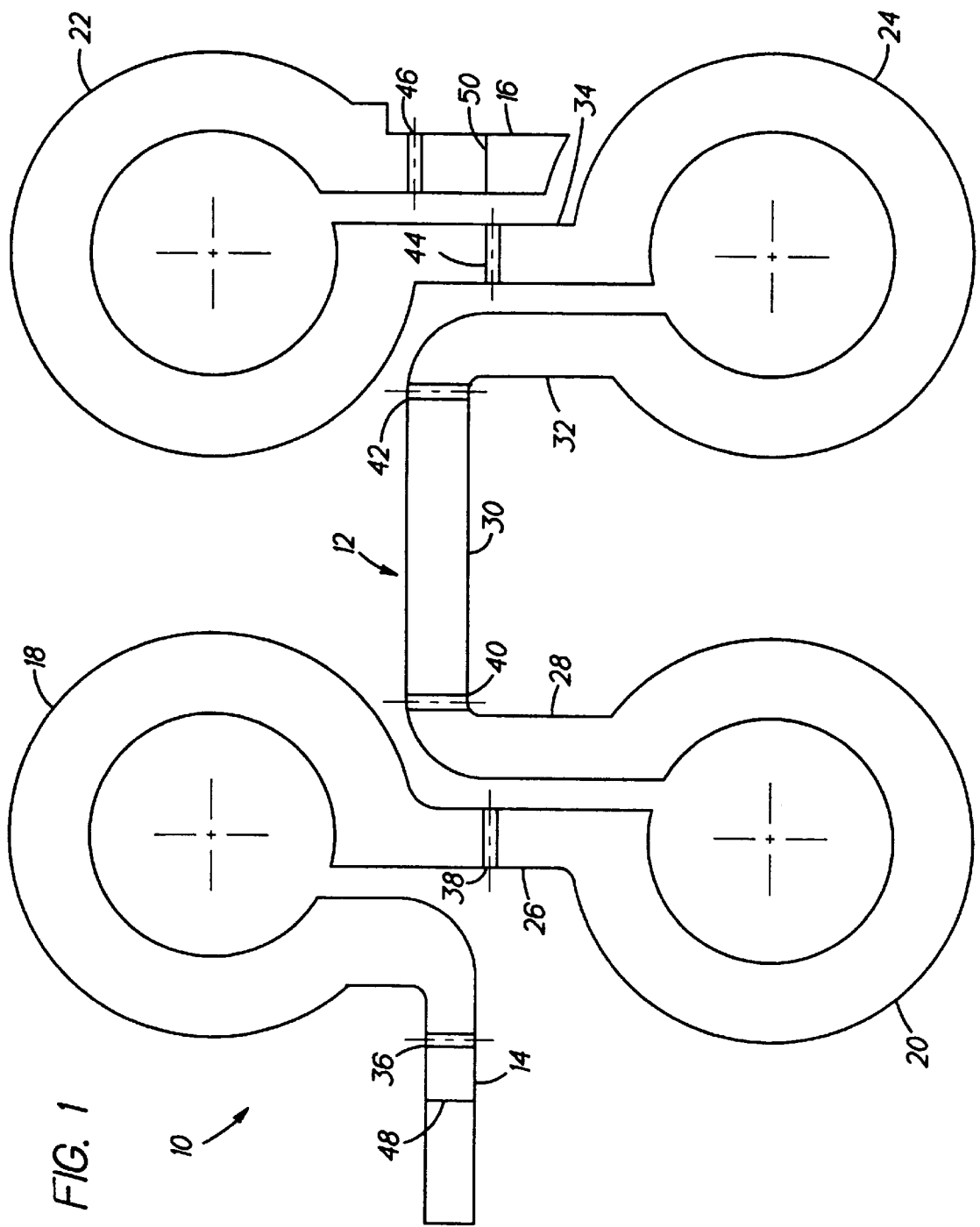
FIG. 1 is a top plan view of a blank embodying the invention.

FIG. 1 illustrates a blank formed from a sheet of conductive material embodying the invention. The blank, generally designated 10, is stamped, punched, cut or otherwise formed from a sheet of conductive material such as copper or aluminum. In the illustrated embodiment, the blank 10 is stamped from a sheet of copper having a thickness of about 0.010 inch. The blank 10 defines a continuous conductive path 12 including a first terminal end 14, a second terminal end 16 and an alternating series of loops 18–24 and connecting portions 26–34. The blank 10 is bent or folded at a number of preselected fold areas 36–50 on the conductive path 12. The fold areas may be scored or otherwise physically marked on the blank 10, or they may simply be designated areas at which the blank is folded.

Figure 2E:
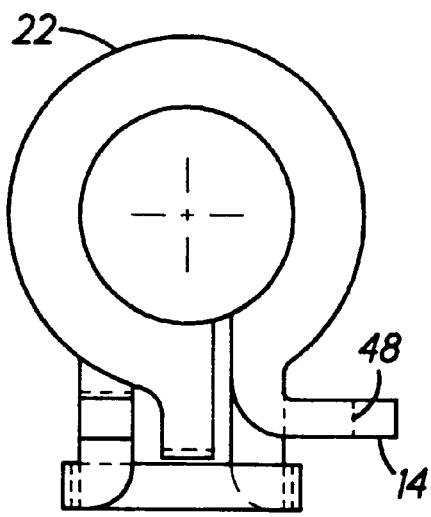

The fold areas are located on the conductive path 12 and the connecting portions 26–34 are dimensioned such that when the blank 10 is folded all of the loops 18–24 are positioned in overlying registration with one another. FIGS. 2a–2e illustrate the sequence for folding the blank 10 to position the loops in this orientation, with FIG. 2e showing the blank 10 in its completely folded configuration. Starting with the unfolded blank 10 shown in FIG. 2a, the loop 18 is folded at area 38 to bring loop 18 down behind the loop 20. The entire blank 10 is then rotated upwardly 180° about the axis A–A to orient the blank to the configuration shown in FIG. 2b. The loop 22 is then folded at the fold area 44 to orient the loop 22 up behind loop 24 so that the blank 10 assumes the configuration shown in FIG. 2c. The loops 22 and 24 are then folded at the fold area 42 to bring the blank into the configuration shown in FIG. 2d. Finally, the loops 18 and 20 are folded at the fold area 40 to bring these loops behind the loops 22 and 24. The final configuration of the folded blank is shown in FIG. 2e. As illustrated in FIG. 2e, when the blank is folded into its final configuration all of the loops 18–24 are positioned in overlying registration with one another.

In the illustrated embodiment, the folded blank 10 shown in FIG. 2e forms the primary winding of a transformer, with the loops 18–24 each defining one of four individual turns of the winding. It should be understood, however, that the configuration of the blank 10 is in no way limited to the configuration shown in FIG. 1, nor is the use of the folded blank limited to the formation of transformer windings. The conductive path defined by the blank could be configured to include fewer or more loops than are illustrated in FIG. 1, or to include loops having a shape different from the illustrated circular shape. The number and location of the fold areas and the dimensions of the various connecting portions can also be varied to bring fewer than all of the loops into overlying registration with one another in the folded configuration.

Figure 3:
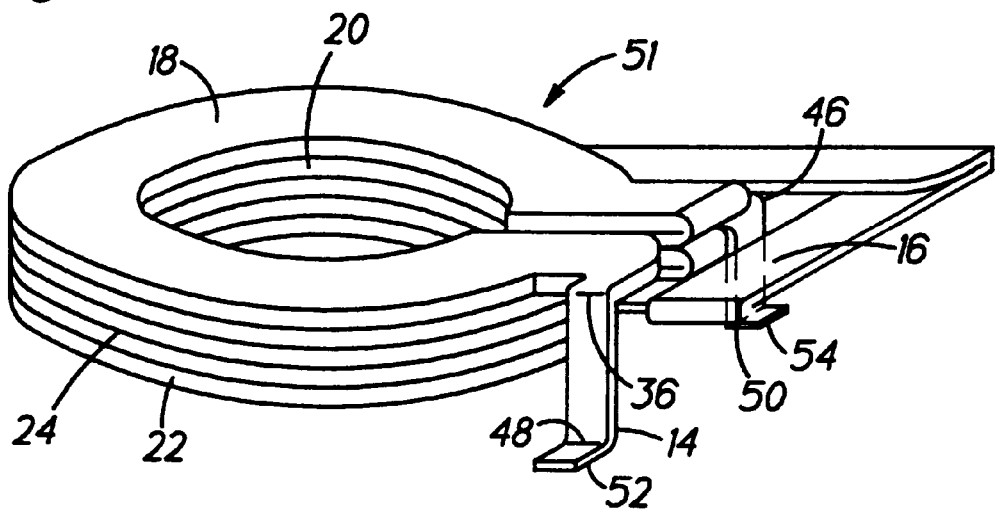
FIG. 3 is a perspective view of the transformer primary winding formed from the folded blank of FIG. 1.

The transformer primary winding formed from the blank 10 is shown generally at 51 in FIG. 3. As illustrated in FIG. 3, the first terminal end 14 of the blank 10 is folded at the fold areas 36 and 48 to provide a first connecting terminal 52, and the second terminal end 16 is folded at the fold areas 46 and 50 to provide a second connecting terminal 54. The terminal connectors 52 and 54 are soldered to associated connection pads on a PC board (not shown) to electrically connect the transformer primary winding 51 within an electrical circuit (also not shown). Note that since the blank 10 defines a continuous conductive path, only two terminal connectors are required to electrically connect all four turns of the transformer primary winding 51 to the circuit. This would be the case even if, as noted above, the blank 10 defined more than the four turns or loops illustrated in FIG. 3.

In order to electrically insulate the individual turns or loops 18–24 from one another, an electrically insulating coating is applied to the blank 10 prior to folding. The entire blank is first provided with a tin-lead plating having a thickness of from about 0.0002 to about 0.0003 inches. After the blank 10 has been plated, a urethane coating is applied to the blank, excluding those portions of the blank corresponding to the fold areas 36–50 and the terminal ends 14 and 16. The urethane coating is applied to a thickness of about 2 mm in a two-stage process. Applying the coating in two stages insures complete coverage of the blank 10 and provides a coating with a highly uniform thickness.

It should be understood that the invention is not limited to this particular method for insulating the windings. Doughnut-shaped inserts made of a dielectric material can be interleaved with the multiple turns or loops 18–24 of the winding 51. For example, a polyester material, such as Mylar® manufactured by DuPont, may be used for the dielectric material. The dielectric doughnuts are dimensioned to extend slightly beyond the inner and outer diameter of the turns to insure complete insulation not only of the planar surfaces of the turns 18–24, but also of their inner and outer edge portions.

Figure 4:
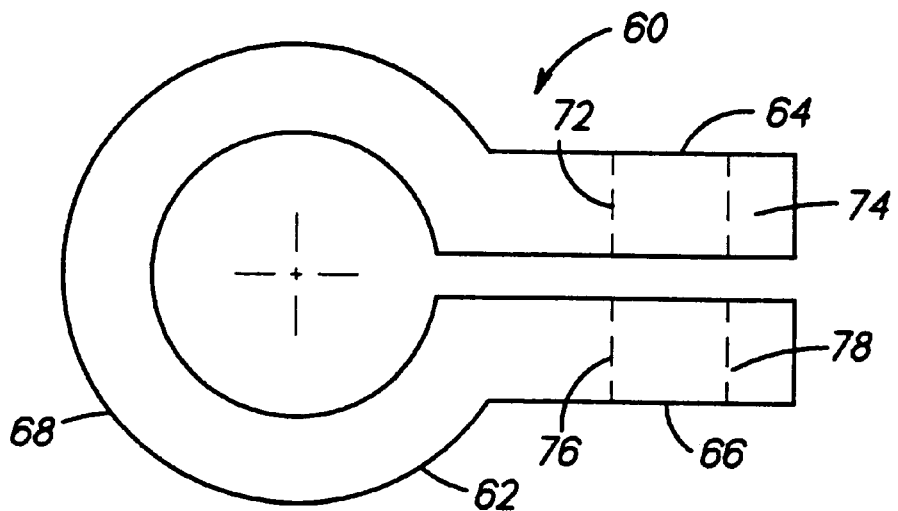
FIG. 4 is a top plan view of a second blank used to form a single-turn transformer secondary winding.

FIG. 4 illustrates a second blank, generally designated 60, which in the illustrated embodiment is used to form a single-turn transformer secondary winding that is coupled with the primary winding 51. As in the case of the blank 10 the blank 60 is stamped, punched, cut or otherwise formed from a sheet of conductive material such as copper or aluminum. In the illustrated embodiment of FIG. 4, the blank 60 is stamped from a sheet of copper having a thickness of about 0.03 inch. The blank 60 defines a continuous conductive path 62 including a first terminal end 64, a second terminal end 66 and a loop 68 disposed between the two terminal ends. The blank 60 further includes preselected folding locations 72–78 which may be scored or otherwise physically marked on the blank 60 or they may simply be designated areas at which the blank is folded.

Figure 5:
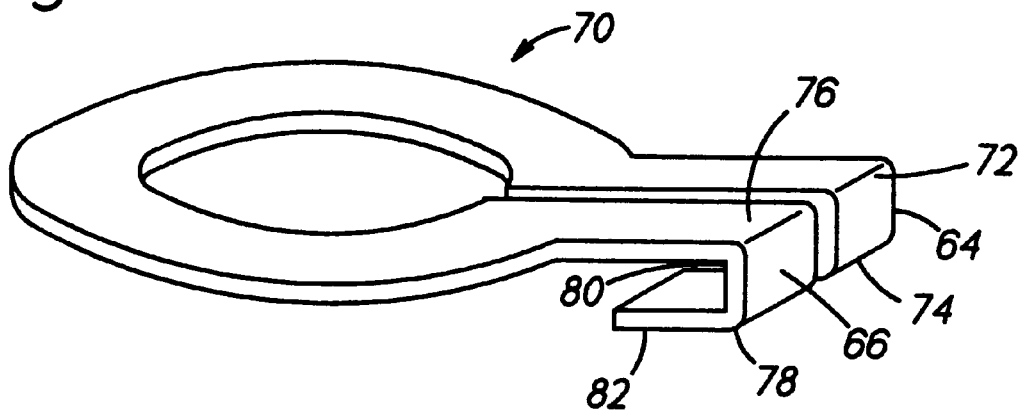
FIG. 5 is perspective view of the transformer secondary winding formed from the blank shown in FIG. 4.

As noted above, the blank 60 is used to form a single-turn transformer secondary winding which is shown generally at 70 in FIG. 5. As shown in FIG. 5, the first terminal end 64 of the blank 60 is folded at the folding locations 72 and 74 to provide a connecting terminal 80, and the second terminal end 66 is folded at the folding locations 76 and 78 to provide a connecting terminal 82. The connecting terminals 80 and 82 are soldered to associated connection pads on a PC board (not shown) to electrically connect the transformer secondary winding 70 within an electrical circuit (also not shown). The transformer secondary winding 70 is provided with an electrically insulating coating in the same manner discussed above with respect to the transformer primary winding 51. Prior to bending or folding the blank 60 at the preselected folding areas, the entire blank 60 is plated with a tin-lead plating having a thickness of from about 0.0002 to about 0.0003 inches. A urethane coating having a thickness of about 2 mm is then applied to the blank 60, excluding those portions of the blank corresponding to the folding areas 72–78 and the terminal ends 64 and 66. As with the blank 10, the urethane coating is applied to the blank 60 in a two-stage process to insure complete coverage and uniform thickness.

FIGS. 6 and 7 illustrate a transformer, generally indicated at 84, which includes the multi-turn primary winding 51 and the single-turn secondary winding 70. In the preferred embodiment shown in FIGS. 6 and 7, the transformer primary and secondary windings are assembled by inserting the secondary winding 70 between the turns 20 and 24 of the primary winding 51, such that all the turns 18–24 and 68 are in overlying registration with one another and define a central aperture 86. It should be understood, however, that the invention is not limited in this regard and that the single-turn secondary winding 70 could be disposed adjacent to either the loop 18 or 24 of the primary winding 51.

The primary and secondary windings are magnetically coupled to an inductive core made, for example, from a ferrite material to form a closed magnetic loop. This is accomplished by mating two generally E-shaped core halves 88, 90 which extend through the central aperture defined by the windings 51 and 70, as shown best in FIG. 7. Once the core halves 88, 90 are mated, they are clipped or bonded together to form a whole core 89 and to complete the transformer 84. As shown best in FIG. 7, the fully assembled transformer 84 presents a low profile and a low overall volume, with the planar windings 51 and 70 substantially filling a window 91 defined by the core halves 88, 90.

Since the planar secondary winding 70 is disposed between and immediately adjacent to the loops or turns 20 and 24 of the planar primary winding 51 in a close stacking arrangement, enhanced electromagnetic coupling between the primary and secondary windings is provided. The close coupling between the windings 51 and 70 reduces the leakage inductance of the transformer 84. The planar configuration of the windings 51 and 70 provides an increase in surface area and volume as compared with conventional wire windings or printed windings. This provides the windings 51 and 70 with increased current carrying capability which results in lower conduction losses for the transformer and higher thermal dissipation to prevent overheating than is typical of prior art transformers and other inductive devices which utilize conventional windings. These characteristics provide advantages in high frequency applications, such as switching power supplies, where there is a need for low profile construction, low conduction losses and high thermal dissipation.

Figure 8:
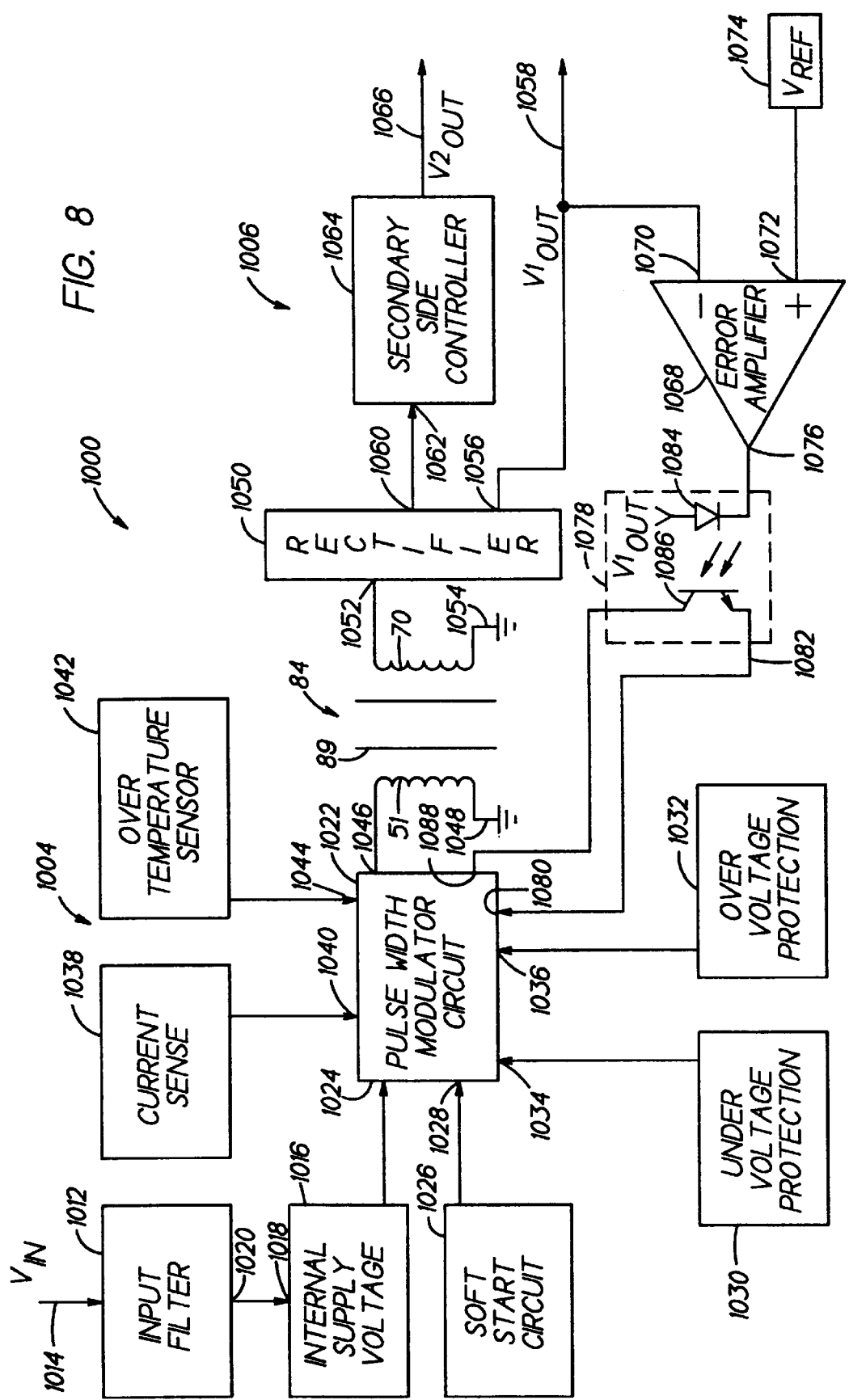
FIG. 8 is a block diagram illustrating a switching power supply embodying the invention.

FIG. 8 illustrates in block diagram form a switching power supply 1000 having multiple outputs which employs the low-profile planar transformer 84 described above. The switching power supply 1000 directly benefits from the previously described features of the planar transformer 84. The low profile characteristic of the planar transformer permits the power supply 1000 to share in a low profile construction so as to benefit the immediate installation area of the power supply where available space is often limited. High current carrying capacity and thermal dissipation coupled with low conduction losses and leakage inductance of the planar transformer 84 directly results in a more cost effective and reliable power supply. Reliability of the power supply is further benefited from the relatively few transformer terminals which need to be connected to surrounding circuitry in the power supply.

The power supply 1000 can generally be divided into a primary side 1004 and a secondary side 1006. The primary side 1004 includes components directly or indirectly connected via electrical lines to the primary winding 51 of the planar transformer 84, and the secondary side 1006 includes components directly or indirectly connected via electrical lines to the secondary winding 70 of the planar transformer 84. The primary winding 51 and the secondary winding 70 are preferably electromagnetically coupled via the magnetic core 89.

Multiple-output power supplies are typically used in the telecommunications industry, and the power supply 1000 will be described, by way of example only, with reference to telecommunication industry standards. The power supply 1000 includes an input filter 1012 having an input to be coupled to a DC source voltage ($V_{IN}$) along line 1014. An internal supply voltage sub-circuit 1016 has an input 1018 coupled to an output 1020 of the input filter 1012. A pulse width modulator sub-circuit 1022 (PWM circuit) which includes a PWM, such as a PWM Current-Mode Controller CS-3843 manufactured by Cherry Semiconductor Corp. An output of the internal supply voltage sub-circuit 1016 is coupled to a first input 1024 of the PWM circuit 1022. A soft start sub-circuit 1026 is coupled to a second input 1028 of the PWM circuit 1022. An under voltage protection sub-circuit 1030 and an overvoltage protection sub-circuit 1032 are coupled to third input 1034 and fourth input 1036 of the PWM circuit 1022, respectively. A current sense sub-circuit 1038 is coupled to a fifth input 1040 of the PWM circuit 1022, and an over temperature sub-circuit 1042 is coupled to a sixth input 1044 of the PWM circuit 1022. The PWM circuit 1022 has a first output 1046 coupled to a first end of the primary winding 51 of the planar transformer 84. A second end of the primary winding 51 is grounded at 1048.

The secondary side 1006 of the power supply 1000 includes a rectifier sub-circuit 1050 having an input 1052 coupled to a first end of the secondary winding 70 of the planar transformer 84. A second end of the secondary winding 70 is grounded at 1054. A first output 1056 of the rectifier sub-circuit 1050 carries a first regulated output voltage ($V_1OUT$) along line 1058, and a second output 1060 of the rectifier sub-circuit 1050 is coupled to an input 1062 of a secondary side controller 1064. The secondary side controller 1064 has an output for carrying a second regulated output voltage ($V_2OUT$) along line 1066.

The secondary side 1006 further includes an error amplifier sub-circuit 1068 having an inverting input 1070 coupled to the line 1058 carrying $V_1OUT$. A non-inverting input 1072 of the error amplifier sub-circuit 1068 is coupled to a voltage reference sub-circuit 1074. An output 1076 of the error amplifier sub-circuit 1068 is coupled to an input of an opto-coupler 1078 for generating a feedback signal to be received at a seventh input 1080 of the PWM circuit 1022 via line 1082. The opto-coupler 1078 may include, for example, a light emitting diode (LED) 1084 which optically communicates with photo-transistor 1086. The anode of the LED is coupled to a voltage source, such as $V_1OUT$, and the collector of the photo-transistor 1086 is coupled to a second output 1088 of the PWM circuit 1022.

The operation of the switching power supply will now be briefly explained with reference to FIG. 8. The input filter 1012 receives a direct current (DC) input voltage ($V_{IN}$) typically in the range of about 36 VDC to about 72 VDC in the telecommunications industry. The input filter 1012 prevents unwanted noise current back onto the line 1014 which supplies voltage to the power supply 1000 from the voltage source (not shown). The filtered source voltage is fed to the internal supply voltage sub-circuit 1016 which generates a generally fixed voltage, such as about 11 VDC, that powers the PWM. The PWM circuit 1022 pulse width modulates the filter input voltage signal to generate a pulsed primary-side signal at the first output 1046 of the PWM circuit 1022 that is received by the primary winding 51 of the planar transformer 84.

The pulsed primary-side signal on the primary winding 51 induces an alternating current (AC) secondary-side signal on the secondary winding 70. The voltage magnitude of the secondary-side signal is proportional to that of the primary-side signal based on the turns ratio of the primary and secondary windings 51 and 70 respectively. The rectifier sub-circuit 1050 generates from the secondary-side signal a DC signal defining a first or main output voltage ($V_1OUT$) carried on the line 1058. The rectified secondary-side signal is further fed to the input 1060 of the secondary side controller 1064 which modulates the rectified secondary-side signal to generate along the line 1066 a second or auxiliary output voltage ($V_2OUT$) having an average voltage magnitude which is smaller than that of $V_1OUT$.

The high current carrying capacity and thermal dissipation, as well as the low conduction losses and leakage inductance characteristic of the planar transformer 84 permits the power supply 1000 to provide, for example at 48 volts input, a well-regulated split in the voltage outputs $V_1OUT$ and $V_2OUT$ while generating about, but not limited to, 100 watts of total output power. This well regulated split in the voltage outputs at 100 watts is significantly greater than the 4050 watt output power limit exhibited by prior multi-output power supplies incorporating conventional transformers. Further, the low conduction losses of the transformer 84 as compared to conventional transformers allows the power supply 1000 to be smaller than conventional power supplies of similar output power because the power supply 1000 is relatively more efficient and generates about half the amount of heat required to be dissipated. These heat dissipation advantages further mean that the power supply 1000 does not need to be potted or embedded in thermally insulating material, thereby eliminating manufacturing costs and eliminating the thermal stress on potting material.

The error amplifier sub-circuit 1068 and the opto-coupler 1078 cooperate to form a feedback circuit that sends voltage adjustment signals to the PWM circuit 1022. More specifically, the first or main output voltage $V_1OUT$ is fed to the inverting input 1070 of the error amplifier sub-circuit 1068 and compared with a voltage reference fed into the non-inverting input 1072 from the voltage reference sub-circuit 1074. If the actual magnitude of the main voltage $V_1OUT$ is different from that of the expected value of, for example, 5 volts, the error amplifier sub-circuit 1068 generates at the output 1076 a voltage adjustment signal that is carried via the opto-coupler 1078 to the seventh input 1088 of the PWM circuit 1022. The PWM circuit 1022 then adjusts the primary-side signal voltage such that the actual magnitude of $V_1OUT$ is changed to that of the expected magnitude.

Additional features shown in the power supply 1000 of FIG. 8 are employed to protect the power supply. For example, the soft start sub-circuit 1026 may be included to prevent the PWM from making wide pulse widths during turn-on of the power supply 1000 and causing an output voltage overshoot.

The under voltage protection sub-circuit 1030 may be used to signal the PWM to cease output pulses if, for example, $V_{IN}$ falls below 33 VDC. In the event that the power supply 1000 fails and no longer has closed-loop operation, a dangerously high output voltage of, for example, 7 VDC may be passed to the load. To protect the load from such a high voltage, the overvoltage protection sub-circuit 1032 pulls down the supply voltage to the PWM to terminate the output pulses from the PWM circuit 1022.

The current sense sub-circuit 1038 generates a current sense signal which resembles the transformer primary current. The primary sense signal is fed to the PWM circuit 1022 as part of a closed-loop current mode control. The primary sense signal provides protection from output overload and short circuit conditions.

The overtemperature protection sub-circuit 1042 may employ, for example, a positive temperature coefficient (PTC) thermistor (not shown) having an impedance that rapidly changes when its temperature exceeds, for example, 110° C. A high voltage signal is sent to the PWM circuit 1022 in order that the PWM circuit lowers its output voltage until the PTC cools and its resistance decreases. The overtemperature feature thus protects the power supply 1000 from being damaged through misuse in a high temperature environment.

Figure 9:
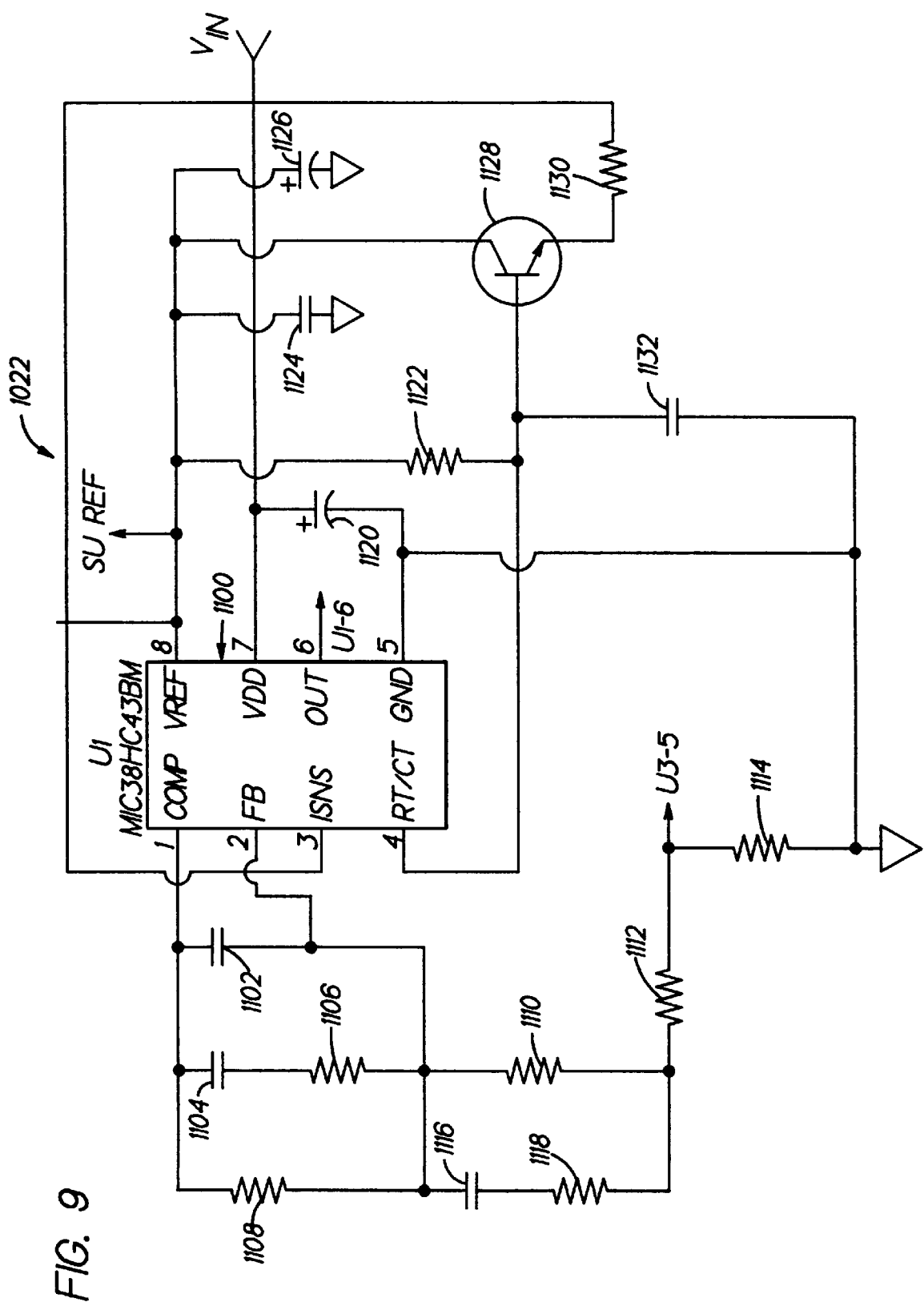
FIG. 9 illustrates the pulse width modulator circuit of the power supply shown in FIG. 8.
Figure 10:
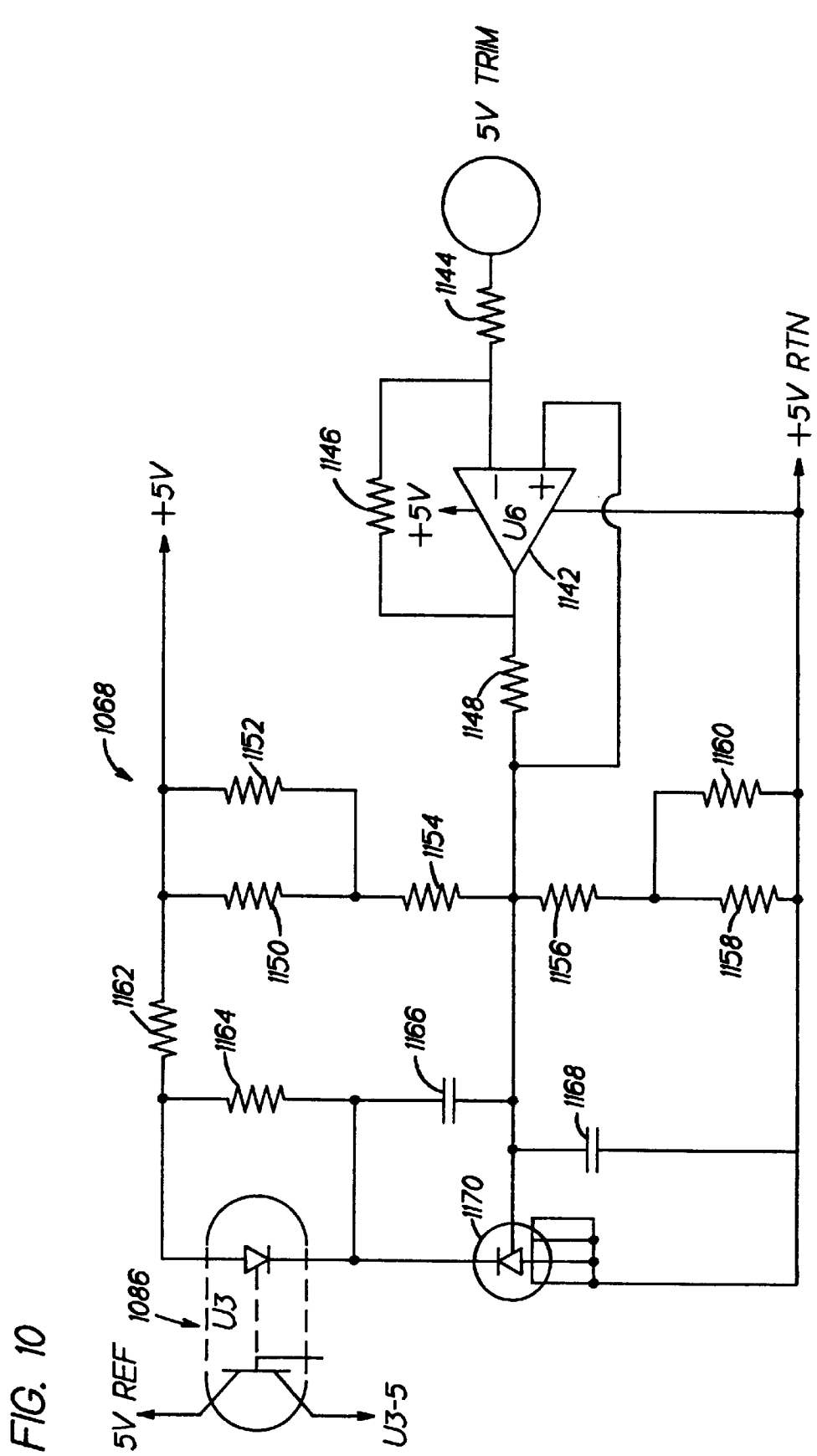
FIG. 10 illustrates the error amplifier subcircuit and opto-coupler subcircuit of the power supply shown in FIG. 8.
Figure 11:
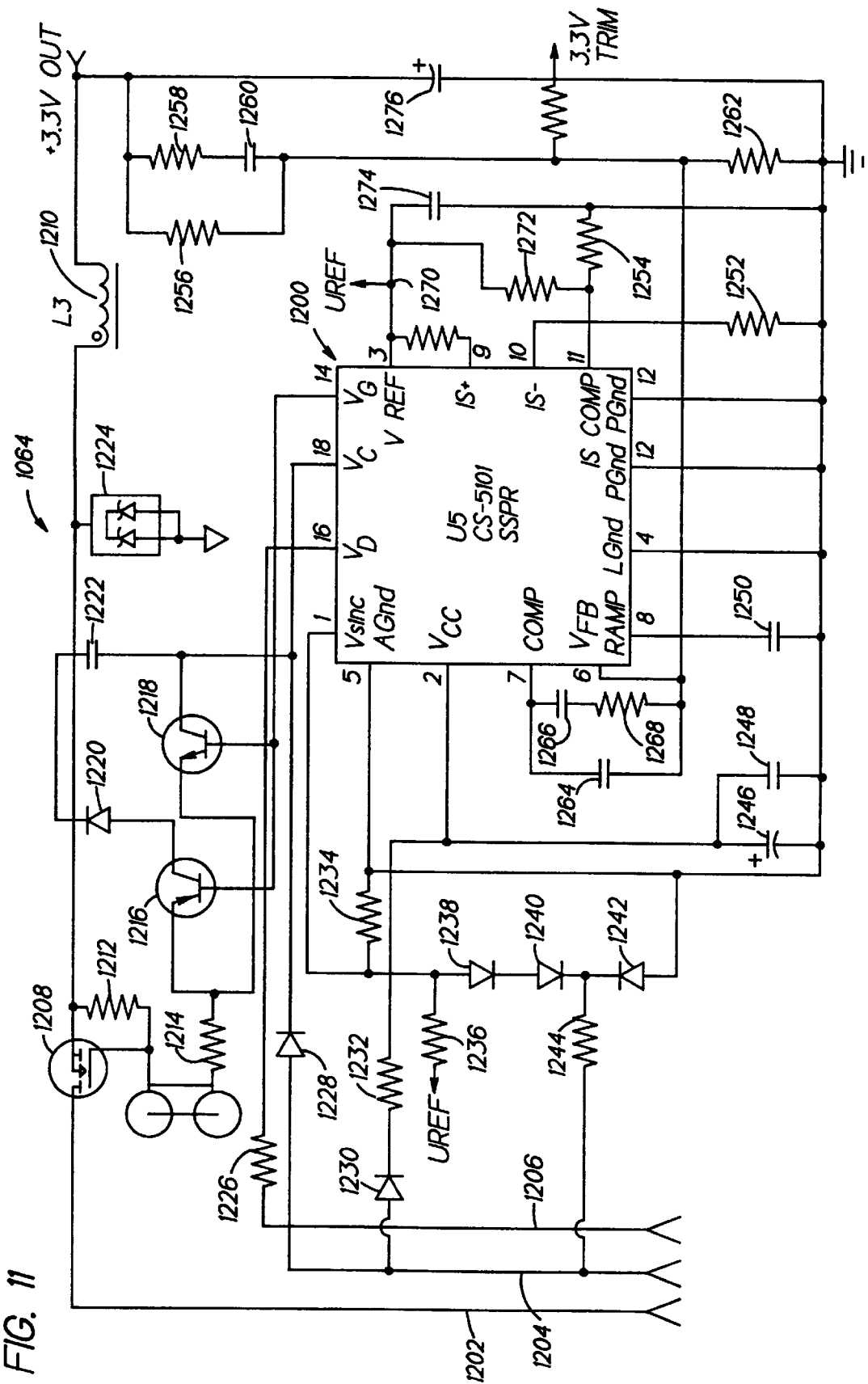
FIG. 11 illustrates the secondary side controller of the power supply shown in FIG. 8.

FIGS. 9–11 illustrate in greater detail the PWM circuit 1022 (FIG. 9), the error amplifier sub-circuit 1068 and the opto-coupler 1078 (FIG. 10) and the secondary side controller 1064 (FIG. 11). As shown in FIG. 9, the PWM circuit 1022 includes a PWM controller, such as a MIC38HC43BM PWM Controller IC 1100 which operates as described above with reference to the PWM circuit 1022 of FIG. 8. As shown in FIG. 9, the PWM 1100 controller includes eight terminals referenced: COMP (terminal 1), FB (terminal 2), ISNS (terminal 3), RT/CT (terminal 4), GND (terminal 5), OUT (terminal 6), VDD (terminal 7) and VREF (terminal 8). A capacitor 1102 is coupled between the COMP and FB terminals of the PWM controller 1100. A capacitor 1104 and resistor 1106 are coupled in series with one another and in parallel with the capacitor 1102. A resistor 1108 is also coupled in parallel with the capacitor 1102. A resistor 1110 is coupled at one end to the FB terminal of the PWM controller 1100. The resistor 1110 is coupled at another end to one end of a resistor 1112 which is coupled to ground via another resistor 1114. A series connected capacitor 1116 and resistor 1118 are coupled in parallel with the resistor 1110. An electrolytic capacitor 1120 has a positive terminal coupled to the VDD terminal of the PWM controller 1100, and has a negative terminal coupled to the GND terminal. A resistor 1122 has one end coupled to the VREF terminal and another end coupled to the RT/CT terminal. Capacitors 1124 and 1126 each have one respective terminal coupled to the VREF terminal and another respective terminal coupled to ground. A NPN transistor 1128 has its base coupled to the RT/CT terminal of the PWM controller 1100, its collector coupled to the VREF terminal, and its emitter coupled via a resistor 1130 to the ISNS terminal of the PWM controller 1100. A capacitor 1132 is coupled between the base of the transistor 1128 and ground.

As shown in FIG. 10, the error amplifier sub-circuit 1068 includes a differential amplifier 1142, such as a LM358 amplifier. An inverting input of the amplifier 1142 is coupled to a DC voltage potential, such as 5 volts, via a resistor 1144. A feedback resistor 1146 is coupled between the inverting input and output of the amplifier 1142. A resistor 1148 has one end coupled to the output of the amplifier 1142 and another end coupled to a non-inverting input of the amplifier 1142. A series and parallel combination of resistors 1150, 1152 and 1154 are coupled between a voltage potential, such as 5 volts, and the non-inverting input of the amplifier 1142. Another series and parallel combination of resistors 1156, 1158 and 1160 are coupled between the non-inverting input and a return line, such as the 5 volt return line as shown in FIG. 10. A resistor 1162 has one end coupled to the 5 volt voltage potential and a second end coupled to a first input terminal of the opto-coupler 1086, such as to an anode of an internal LED within an MOC205 opto-coupler as shown in FIG. 10. A series connected resistor 1164 and capacitor 1166 are coupled between the first input terminal of the opto-coupler 1086 and the non-inverting input of the amplifier 1142. A capacitor 1168 is coupled between the non-inverting input and ground potential. A junction between the resistor 1164 and the capacitor 1166 is coupled to a second input terminal (the cathode of the internal LED) of the opto-coupler 1086. A voltage reference (VR) source 1170, such as a TL431C voltage reference IC, includes a first input terminal (connected to an anode of an internal diode) coupled to the 5 volt return line, a second input terminal (connected to a cathode of the internal diode) and a reference output coupled to the non-inverting input of the amplifier 1142. An internal photo-transistor of the opto-coupler 1086 has its emitter coupled to a junction of the resistors 1112 and 1114 of the PWM circuit of FIG. 9. The collector of the internal photo-transistor is coupled to a 5 volt reference potential.

As shown in FIG. 11, the secondary side controller 1064 includes a secondary side post regulator (SSPR) 1200, such as a CS-5101 SSPR manufactured by Cherry Semiconductor Corp. The SSPR 1200 includes sixteen terminals referenced: Vsinc (terminal 1), VCC (terminal 2), VREF (terminal 3), LGnd (terminal 4), AGnd (terminal 5), VFB (terminal 6), COMP (terminal 7), RAMP (terminal 8), IS+ (terminal 9), IS− (terminal 10), IS COMP (terminal 11), PGnd (terminals 12, 13), VG (terminal 14), VC (terminal 15) and VD (terminal 16). Lines 1202, 1204 and 1206 are coupled to the rectifier sub-circuit 1050 of FIG. 8.

A switching transistor 1208, such as an enhancement-type IGFET shown in FIG. 11, has its drain coupled to the line 1202, its base and source coupled to a first end of an inductor 1210, and its gate coupled to its base and source via resistor 1212. A second end 1211 of the inductor 1210 defines the second or auxiliary output of the power supply. Resistor 1214 has one end coupled to the gate of the transistor 1208, and a second end coupled to an emitter of a PNP transistor 1216 and an emitter of an NPN transistor 1218. The base of the transistor 1216 is coupled to the base of the transistor 1218 and the VG terminal of the SSPR 1200. A diode 1220 has its anode coupled to a collector of the transistor 1216 and a cathode coupled to the base and source of the switching transistor 1208. A collector of the transistor 1218 is coupled to the base and source of the switching transistor 1208 via capacitor 1222.

A pair of Schottkey diodes have respective cathodes coupled to the base and source of the switching transistor 1208 and respective anodes coupled to ground potential. A resistor 1226 has one end coupled to the line 1206 and another end coupled to the terminal VD of the SSPR 1200. A diode 1228 has its anode coupled to the line 1204 and its cathode coupled to the terminal VC of the SSPR 1200. A diode 1230 has its anode coupled to the line 1204 and its cathode coupled via resistor 1232 to the terminal VCC of the SSPR 1200. A resistor 1234 is coupled at a first end to the terminal Vsinc of the SSPR 1200 and is coupled at a second end to the terminal AGnd of the SSPR. A resistor 1236 is coupled at a first end to the first end of the resistor 1234 and is coupled at a second end to the terminal VREF of the SSPR 1200. A diode 1238 has its anode coupled to the first end of the resistor 1236 and its cathode coupled to an anode of diode 1240. A cathode of the diode 1240 is coupled to a cathode of diode 1242 and a first end of a resistor 1244. An anode of the diode 1242 is coupled to the terminal AGnd of the SSPR 1200, and a second end of the resistor 1244 is coupled to the line 1204.

Capacitors 1246, 1248 have respective first terminals coupled to the terminal VCC of the SSPR 1200, and respective second terminals coupled to ground potential. A capacitor 1250 has one terminal coupled to the RAMP terminal of the SSPR 1200 and a second terminal coupled to ground. A resistor 1252 has a first end coupled to the IS− terminal of the SSPR 1200 and a second end coupled to ground potential. A resistor 1254 has a first end coupled to the IS COMP terminal of the SSPR, and a second end coupled to ground potential. A series and parallel combination of resistors 1256, 1258 and capacitor 1260 are coupled at one end of the combination to the auxiliary output and coupled at a second end to the VFB terminal of the SSPR 1200 and to a first end of a resistor 1262. A second end of the resistor 1262 is coupled to ground potential. A parallel and series combination or capacitors 1264, 1266 and resistor 1268 have one end of the combination coupled to the COMP terminal of the SSPR 1200, and a second end of the combination coupled to the VFB terminal of the SSPR.

A resistor 1270 has a first end coupled to the VREF terminal of the SSPR, and a second end coupled to the IS+ terminal of the SSPR. A resistor 1272 has a first end coupled to the VREF terminal of the SSPR, and a second end coupled to the IS COMP terminal of the SSPR. A capacitor 1274 is coupled at a first terminal to the terminal VREF of the SSPR 1200, and at a second terminal coupled to ground potential. Finally, an electrolytic capacitor 1276 has a positive terminal coupled to the auxiliary output of the power supply, and a negative terminal coupled to ground potential.

Referring now to FIGS. 9–11, $V_1OUT$ is monitored by a voltage divider network. More specifically, $V_1OUT$ is monitored at the junction of the series-connected resistors 1154 and 1156 located generally within the error amplifier sub-circuit 1068 of FIG. 10. The voltage reference source 1170 (see FIG. 4) modulates current through the internal LED of the opto-coupler 1086 to maintain a constant voltage level of, for example 2.5 volts, at the VREF (terminal 8) of the PWM controller 1100 of FIG. 3. The PWM controller 1100 maintains 2.5 volts at FB (terminal 2) by adjusting the output pulse width generated at OUT (terminal 6) that is indirectly coupled to the planar transformer 84. Adjusting the pulse width of the PWM controller maintains $V_1$OUT at a constant voltage level of, for example 5 volts, without regard to input voltage or load fluctuations. The resistor 1122 and the capacitor 1132 (shown in FIG. 9) create a ramp voltage and generate the clock frequency signal for the PWM controller 1100 which is buffered by the NPN transistor 1128 and added to the primary sense signal.

Referring to FIG. 11, the SSPR sub-circuit 1200 generates an additional regulated output voltage $V_2$OUT of, for example 3.3 volts. More specifically, the SSPR 1200 employs the same power pulse that is filtered into the 5 volt output $V_1$OUT. A common secondary winding is thus used to create two different output voltages (i.e., 5 volts for $V_1$OUT and 3.3 volts for $V_2$OUT). The SSPR 1100 delays the turn-on of the switching transistor 1208 in order to generate a narrower power pulse relative to the power pulse for $V_1$OUT. The narrower power pulse which is filtered results in a lower auxiliary output voltage $V_2$OUT (i.e., 3.3 volts) relative to the main output voltage $V_1$OUT (i.e., 5 volts). The secondary side controller 1064 incorporates a complete feedback control loop in order to maintain the auxiliary output voltage $V_2$OUT at a constant predetermined level.

As will be recognized by those of skilled in the pertinent art, numerous modifications may be made to the above-described and other embodiments of the present invention without departing from the scope of the invention as defined in the appended claims. For example, although the planar transformer as previously shown and described is shown as a multi-turn primary winding and a single-turn secondary winding, it should be understood that the planar transformer embodying the present invention may also be a single-turn primary winding and a multi-turn secondary winding, or may be a multi-turn primary winding and a multi-turn secondary winding. Accordingly, the preceding portion of this specification is to be taken in an illustrative, as opposed to a limiting sense.

What is claimed is:

1. A self-supporting blank formed from a sheet of conductive material and defining a continuous conductive path, said blank being foldable for mounting within a window of an inductive core to magnetically couple the folded blank to the inductive core, said blank having first and second sides and an edge portion extending therebetween, said path including first and second terminal ends and at least three loops disposed along the path, each of said loops forming a respective turn of a winding, said blank being foldable at preselected folding locations on the path to position each of said loops forming a respective turn of a winding in a respective plane and in overlying registration to one another, said folded blank being mountable within the window of the core with each turn extending from a first side of the window on one side of the core to a second side of the window located on an approximately opposite side of the core, and back again through the core from the second side of the window to the first side of the window, to thereby define a turn in the respective plane, and said folding locations being located on one side of the window.

2. The blank of claim 1, wherein the loops are disposed along the continuous conductive path in substantially the same plane prior to the blank being folded.

3. The blank of claim 2, wherein the conductive path includes an alternating series of loops and connecting portions, said alternating series comprising a first pair of loops connected together by a first connecting portion and at least a third loop connected to the first pair of loops by a second connecting portion extending between one of the loops in the first pair and the third loop, the loops and the connecting portions disposed relative to one another such that when the blank is folded at the preselected folding locations, the first pair of loops and the third loop are positioned in overlying relation to one another.

4. The blank of claim 3, wherein the conductive path includes the first and a second pair of loops, the first pair of loops connected together by the first connecting portion and the second pair of loops connected together by a third connecting portion, the first and second pairs of loops connected together by the second connecting portion, the loops and the connecting portions disposed relative to one another such that when the blank is folded at the preselected folding locations the loops are positioned in overlying registration to one another.

5. A self-supporting blank as defined in claim 3, wherein the first pair of loops includes first and second loops, and the first and second connecting portions of said loops are elongated, the first connecting portion extends approximately radially from both the first and the second loops, and the second connection portion is oriented approximately perpendicular to the first connecting portion.

6. A self-supporting blank as defined in claim 4, wherein the first pair of loops includes first and second loops, and the second pair of loops includes third and fourth loops, the first, second and third connecting portions are elongated, the first connecting portion extends approximately radially from both the first and the second loops, the second connecting portion extends approximately radially from both the third and the fourth loops, and the second connection portion is oriented approximately perpendicular to both the first and third connecting portions.

7. A self-supporting blank as defined in claim 1, wherein the blank is in the form of a winding with the at least three loops folded in overlying registration to one another, and opposing surfaces of adjacent loops in contact with each other.

8. A self-supporting blank in the form of a winding as defined in claim 7, further comprising an electrically insulative coating on at least the first and second surfaces of the blank forming the loops, and wherein opposing insulative surfaces of adjacent loops are in contact with each other.

9. The blank of claim 1, wherein the terminal ends define means for electrically connecting the conductive path within an electrical circuit.

10. The blank of claim 1, wherein the blank is stamped, punched or cut from a sheet of conductive material.

11. The blank of claim 1, further including:
  a conductive layer applied to the first and second sides and the edge portion of the blank, said conductive layer having a first portion coextensive with at least the first and second terminal ends and the preselected folding locations and a second portion coextensive with the conductive path excluding the first and second terminal ends and the preselected folding locations; and
  an electrically insulating layer applied to the second portion of the conductive layer.

12. A self-supporting blank as defined in claim 1, wherein the blank defines an elongated axis, a first pair of opposing loops located on opposite sides of the elongated axis relative to each other, a second pair of opposing loops located on opposite sides of the elongated axis relative to each other, and axially spaced relative to the first pair of opposing loops, and at least one elongated connecting portion extending in the direction of the elongated axis between the first and second pairs of opposing loops.

13. A self-supporting blank as defined in claim 12, wherein the first pair of opposing loops are foldable in overlying registration to one another, the second pair of opposing loops are foldable in overlying registration to one another, and the two folded pairs of opposing loops are foldable in overlying registration to one another.

14. A self-supporting blank as defined in claim 12, wherein (i) the first pair of opposing loops defines a first loop located on one side of the elongated axis, and a second loop located on the opposite side of the elongated axis relative to the first loop; (ii) the first loop defines a first connecting portion located at one end of the respective turn and extending between the turn and the elongated axis, and a second connecting portion located at the other end of the respective turn and extending between the turn and the elongated axis, and oriented approximately parallel to the first connecting portion; and (iii) the second loop defines a third connecting portion located at one end of the respective turn and extending between the turn and the elongated axis, and a fourth connecting portion located at the other end of the respective turn and extending between the turn and the elongated axis, and oriented approximately parallel to the third connecting portion.

15. A self-supporting blank as defined in claim 12, wherein the first pair of opposing loops defines a first axis extending between the approximate center of each loop of the pair and intersecting the elongated axis; and the second pair of opposing loops define a second axis extending between the approximate center of each loop of the pair and intersecting the elongated axis.

16. A self-supporting blank as defined in claim 15, wherein the first and second axes are approximately parallel.

17. A self-supporting blank as defined in claim 1, wherein the blank defines an elongated axis, a plurality of pairs of opposing first and second loops located on opposite sides of the elongated axis relative to each other, and an elongated connecting portion extending between each adjacent pair of opposing first and second loops, and wherein each respective pair of opposing first and second loops are foldable in overlying registration with one another, and adjacent folded pairs of first and second loops are foldable in overlying registration with one another.

18. A self-supporting blank as defined in claim 17, wherein each of the first and second loops defines a first connecting portion located at one end of the respective turn, and a second connecting portion located at the other end of the respective turn, and the first and second connecting portions of the plurality of first and second loops are foldable in overlying registration to one another upon folding the loops in overlying registration to one another.

19. A conductive winding mountable within a window of an inductive core to magnetically couple the winding to the core, the conductive winding comprising:

a folded self-supporting blank formed from conductive sheet material, said blank defining a continuous conductive path, first and second terminal ends, and at least three loops disposed along the path, each of said loops defining a respective turn of a winding, said blank being foldable at preselected folding locations on the path to position each of said loops defining a respective turn of a winding in a respective plane and in overlying registration to one another to define a planar multi-turn winding, said winding being mountable within the window of the core with each turn extending from a first side of the window on one side of the core to a second side of the window located on an approximately opposite side of the core, and back again through the core from the second side of the window to the first side of the window, to thereby define a turn in the respective plane, and said folding locations being located on one side of the window.

20. A planar magnetic device comprising:

a self-supporting blank defining a continuous conductive path, said blank having first and second sides and an edge portion extending therebetween, said path including first and second terminal ends and at least three loops disposed along the path, each of said loops forming a respective turn of a winding, said blank being folded at preselected folding locations on the path to position each of said loops in a respective plane and in overlying relation to one another;

an inductive core magnetically coupled to the folded blank to form a closed magnetic loop, said folded blank being received within a window of the core with each turn extending from a first side of the window on one side of the core to a second side of the window located on an approximately side of the core, and back again through the core from the second side of the window to the first side of the window, to thereby define a turn in the respective plane, and said folding locations being located on the first side of the window; and means for insulating the loops from one another and from the inductive core.

21. The planar magnetic device of claim 20, wherein the conductive path includes an alternating series of loops and connecting portions, said series comprising a first pair of loops connected together by a first connecting portion and at least a third loop connected to the first pair of loops by a second connecting portion extending between one of the loops in the first pair and the third loop, the loops and the connecting portions disposed relative to one another such that when the blank is folded at the preselected folding locations, the first pair of loops and the third loop are positioned in overlying relation to one another.

22. The planar magnetic device of claim 21, wherein the device is an inductor, the loops defining a planar multi-turn winding of the inductor.

23. The planar magnetic device of claim 21, wherein the device is a transformer, the loops defining one of a planar multi-turn primary and secondary windings of the transformer, the transformer further comprising:

a second blank defining a second continuous conductive path, said second blank having third and fourth sides and an edge portion extending therebetween, said second conductive path including third and fourth terminal ends and at least a fifth loop disposed along the second conductive path, said fifth loop defining the other of the planar primary and secondary windings of the transformer and being disposed in a plane adjacent to the one of the primary and secondary winding;

and wherein the means for insulating also insulates the secondary winding from the primary winding and from the inductive core.

24. The transformer of claim 23 further comprising:
- a first conductive layer applied to at least the first and second terminal ends and the folding locations;
- a second conductive layer applied to at least the third and fourth terminal ends.

25. The transformer of claim 24 further comprising:
- a first electrically insulating layer applied to the first blank between the first and second terminal ends and the preselected folding locations; and
- a second electrically insulating layer applied to the second blank between the third and fourth terminal ends.

26. A transformer comprising:
- a primary winding and a secondary winding, each of said windings having first and second terminal connectors, wherein one of the primary and secondary windings is a multi-turn winding and another of said primary and secondary windings is a single-turn winding, the multi-turn winding being made from a blank defining a continuous conductive path having at least three loops, each of said loops forming a respective turn of a winding, said blank being folded at a plurality of preselected folding locations with the turns in overlying registration with one another and each turn defining a respective plane; and
- an inductive core magnetically coupled to the primary and secondary windings to form a closed magnetic loop, wherein the multi-turn winding is received within the window of the core with each turn extending from a first side of the window on one side of the core to a second side of the window located on an approximately opposite side of the core, and back again through the core from the second side of the window through the first side of the window, to thereby define a turn in the respective plane and said folding locations are located on one side of the window.

27. The transformer of claim 26, wherein the single-turn winding is disposed between two turns of the multi-turn winding.

28. The transformer of claim 26, wherein the primary winding is the multi-turn winding, and the secondary winding is the single-turn winding.

29. The transformer of claim 28, wherein the single-turn secondary winding is disposed between two turns of the multi-turn primary winding.

30. The transformer of claim 26, wherein selected portions of the primary and secondary windings have an electrically insulating layer applied thereto to electrically insulate said primary and secondary windings from each other and from the inductive core.

31. A transformer as defined in claim 26, wherein each loop of the multiturn winding defines first and second sides, and inner and outer edge portions extending between the first and second sides, and wherein the outer edges of the loops of the multiturn winding contact the inductive core.

* * * * *